US012673828B2

(12) United States Patent
Gogsig et al.

(10) Patent No.: US 12,673,828 B2
(45) Date of Patent: Jul. 7, 2026

(54) FOOTWEAR MANUFACTURING CONVEYOR SYSTEM

(71) Applicant: ECCO Sko A/S, Bredebro (DK)

(72) Inventors: Thomas Gogsig, Bredebro (DK); Jacob Bossen, Bredebro (DK); Michael Hansson, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 0 days.

(21) Appl. No.: 18/011,613

(22) PCT Filed: Jun. 23, 2021

(86) PCT No.: PCT/DK2021/050203
§ 371 (c)(1),
(2) Date: Dec. 20, 2022

(87) PCT Pub. No.: WO2021/259437
PCT Pub. Date: Dec. 30, 2021

(65) Prior Publication Data
US 2023/0322493 A1     Oct. 12, 2023

(30) Foreign Application Priority Data

Jun. 26, 2020    (EP) .................................... 20182433

(51) Int. Cl.
*B65G 17/12* (2006.01)
*A43D 111/00* (2006.01)
*B65G 54/02* (2006.01)

(52) U.S. Cl.
CPC ...... *B65G 17/12* (2013.01); *B65G 2201/0229* (2013.01)

(58) Field of Classification Search
CPC .......... B65G 13/08; B65G 19/00; B65G 9/02; B65G 23/23; B65G 39/12; B65G 17/12;
(Continued)

(56) References Cited

U.S. PATENT DOCUMENTS 3,333,672 A * 8/1967 Freeman .............. A43D 117/00
104/208
5,014,625 A 5/1991 Murai et al.
(Continued)

FOREIGN PATENT DOCUMENTS

CN       105686215       6/2016
CN       105686215 A * 6/2016   .......... A43D 119/00
(Continued)

*Primary Examiner* — Gene O Crawford
*Assistant Examiner* — Muhammad Awais
(74) *Attorney, Agent, or Firm* — Lee & Hayes, P.C.

(57) ABSTRACT

A footwear manufacturing conveyor system includes a rail system. A first rail and guideways positioned within the boundary of the first rail provide at least one path of travel along the rail system. A propulsion system with a plurality of electrical coils is configured to provide magnetic propulsion. A vehicle has a magnet is configured to interact with the propulsion system. A receiving part is adapted to receive a footwear last. A load bearing element has a primary surface which is configured to engage with the first rail and an opposite secondary surface. The rail system further includes a second rail, positioned at an opposite side of the load bearing element.

17 Claims, 5 Drawing Sheets

Figures 1, 2:
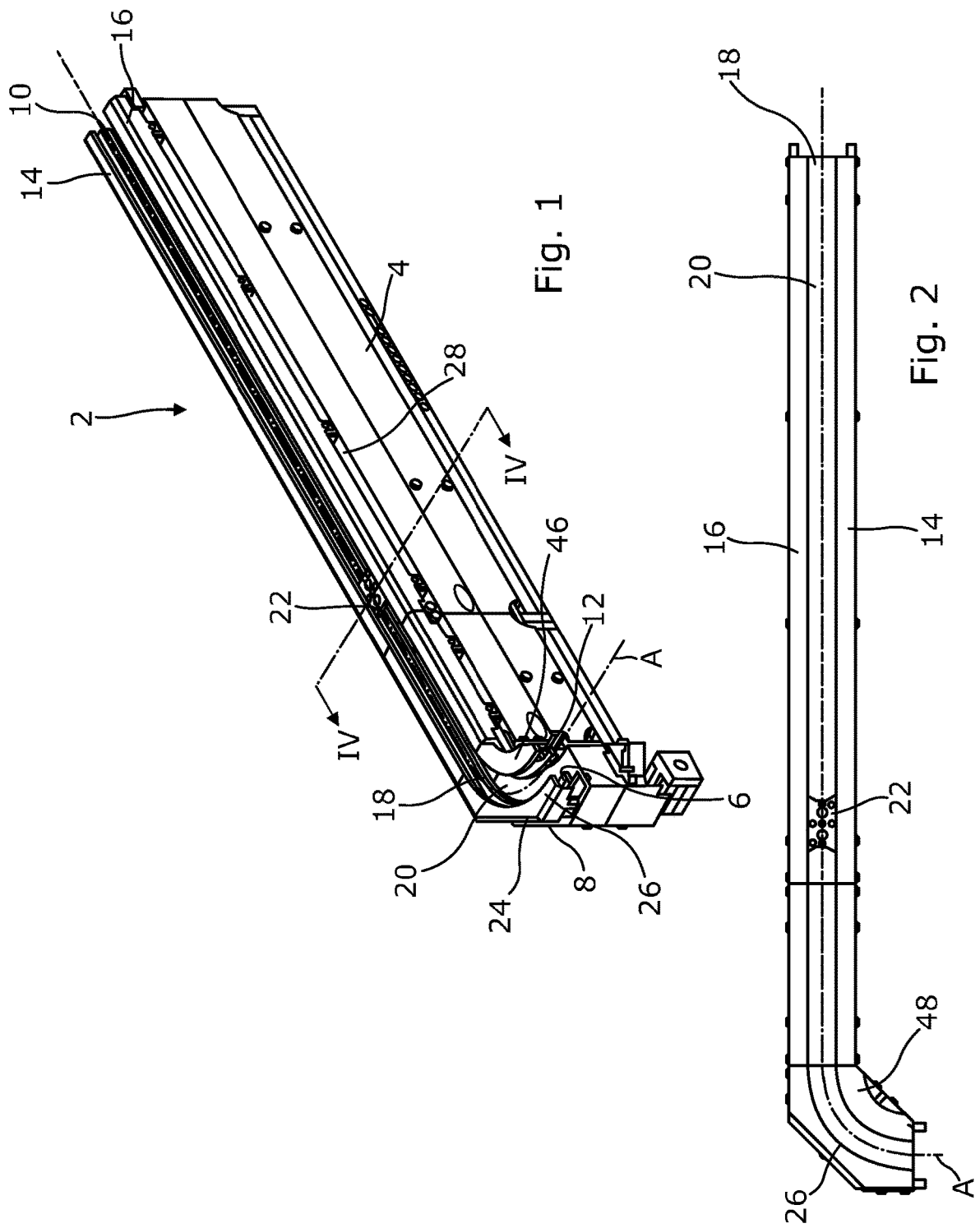

(58) Field of Classification Search
      CPC ............ B65G 2201/0229; B65G 54/02; A43D
                                                         111/00
      USPC ...................................................... 198/465.2
      See application file for complete search history.

(56)                      References Cited

U.S. PATENT DOCUMENTS 5,975,277  A  *  11/1999  Skarlupka .............. B65G 54/02
                                                              198/805
     10,106,339  B2 *  10/2018  Prüssmeier ............ B65G 35/06
     10,336,559  B2 *   7/2019  Koga .................... B65G 54/02
   2012/0012441  A1 *   1/2012  Ishino ................... B65G 17/22
                                                              198/793
   2018/0086565  A1 *   3/2018  Grosskreuz ........... B65G 23/23
   2019/0068101  A1     2/2019  Sun et al.
   2019/0152022  A1 *   5/2019  Hsu .......................... B25B 5/04

FOREIGN PATENT DOCUMENTS

CN           105899447          8/2016
   CN           105899447  A  *    8/2016  ............ H02K 41/02
   CN           109820287          5/2019
   CN           109820287  A  *    5/2019
   EP             0329007  A2 *    8/1989
   EP             0361340          4/1990
   EP             2387919         11/2011
   EP             3670393          6/2020
   JP            62225108          3/1987
   JP            09132323          5/1997
   WO        WO2015042409          3/2015

* cited by examiner

1

FOOTWEAR MANUFACTURING CONVEYOR SYSTEM

This Application claims priority to PCT Application No. PCT/DK2021/050203, filed Jun. 23, 2021, which claims priority to EP Patent Application No. 20182433.1, filed Jun. 26, 2020, the contents of each of which is incorporated herein by reference.

FIELD OF THE INVENTION

A footwear manufacturing conveyor system comprising a rail system, the rail system comprising; a first rail, and guideways positioned within the boundary of the first rail, adapted to provide at least one path of travel along the rail system, and a propulsion system.

BACKGROUND OF THE INVENTION

In footwear manufacturing processes, there are a number of attempts that are being made to try and automate the production and manufacturing processes for footwear-related items such as footwear, where the attempts are often made in order to increase the effectiveness of footwear manufacturing processes, as well as to improve the quality of the product resulting from the footwear manufacturing process.

One of the things that are being worked with is the introduction of robotics to do some of the tasks that traditionally have been performed by workers, especially in the situations where the production is labor intensive and causes fatigue in the workers.

An issue with prior art footwear manufacturing process systems, is that these systems must handle processes and items involved in a footwear manufacturing process, preferably in a fast, cost-efficient, and reliable way.

There is a need to improve existing footwear manufacturing processes while at the same time obtaining a dynamic footwear manufacturing process.

SUMMARY OF THE INVENTION

In accordance with the present description, there is provided a footwear manufacturing conveyor system comprising: a rail system comprising a first rail, and guideways positioned within the boundary of the first rail, adapted to provide at least one path of travel along the rail system; a propulsion system with a plurality of electrical coils configured to provide magnetic propulsion; a vehicle comprising a magnet configured to interact with the propulsion system, a receiving part adapted to receive a footwear last, and a load bearing element having a primary surface which is configured to engage with the first rail and an opposite secondary surface; wherein the rail system further comprises a second rail, positioned at an opposite side of the load bearing element.

If the load bearing element is only provided with a single point of contact with the first rail, as is shown in the prior art, then any tilting movement of the vehicle may cause the load bearing element from releasing the surface of the first rail, which means that the vehicle will be unstable during movement, as the load bearing element is not in contact with a rail element.

The provision of the second rail, which is positioned on an opposite side of the load bearing element of the vehicle, it is possible to stabilize the vehicle during high acceleration, turns as well as decelerations.

The first rail may be provided with a first rail surface, where the first rail surface may be configured to bear the load from the load bearing element. In a normal direction from the second rail surface. The second rail may comprise a second rail surface, where the second rail surface is arranged a predefined distance away from the first rail surface, where the region between the first rail surface and the second rail surface may be defined as a load bearing gap. The load bearing gap may be arranged to receive the load bearing element of the vehicle, so that the load bearing element of the vehicle is positioned between the first rail surface and the second rail surface.

The first rail surface may be adapted to face the second rail surface, where the first rail and the second rail are parallel to each other and/or where the first rail and the second rail are parallel to each other. The first rail surface may have first width and the second rail surface may have a second width, where the width is along a transverse axis that is perpendicular to the longitudinal axis of the rail. Thus, the first rail surface and the second rail surface may extend along a first plane and/or a second plane which may be defined by a transverse axis and a longitudinal axis. The first plane and the second plane may be parallel to each other.

The load bearing gap may extend between the first rail and the second rail, i.e. from the first rail and to the second rail. The load bearing gap may have a first height that is larger than the a second height of the load bearing element, which means that when the load bearing element is positioned in the load bearing gap, the load bearing element may be in contact with one of the rails at any time. Thus, if the load bearing element is in contact with the first rail, e.g. the first rail surface, the load bearing element will not be in contact with the second rail, e.g. the second rail surface. Similarly, if the load bearing element is in contact with the second rail, e.g. the second rail surface, the load bearing element will not be in contact with the first rail, e.g. the first rail surface. The primary surface of the load bearing element may for example be a bottom surface of one or more wheels, and the opposite secondary surface may for example be the top surface of one or more wheels.

The propulsion element and/or the propulsion system of the rail system may be arranged on a second side of the first rail, where the second side is opposite the first rail contact surface. Thus, the propulsion element of the vehicle and/or the propulsion system may be positioned away from the load bearing gap, on a side of the first rail that faces away from the second rail. Thus, the propulsion system and/or the propulsion element of the vehicle may be arranged outside the load bearing gap between the first rail and the second rail. The propulsion element may for example be a magnetic element, for example a magnet, such as a ferromagnet. The propulsion element may also be referred to as a first propulsion device, and the propulsion system may also be referred to as a second propulsion device.

The provision of the load bearing element may mean that the only part of the vehicle that is in contact with the first rail is the load bearing element, while the remaining parts of the vehicle are adapted not to come into contact with the rail, in order to reduce friction. Should the load bearing element come out of its "normal" position other parts of the vehicle may come into contact with the first rail. The provision of the second rail is intended to reduce the likelihood that the vehicle transforms excessively out of its normal position, and thereby reduces the chance that other parts of the vehicle that may increase friction, come into contact with the first rail.

Within the understanding of the present invention the first rail and the second rail may be arranged in a vertical direction relative to each other, so that the gravitational forces that affect the vehicle and/or the load are transferred to the first rail. This may also mean that the first rail may be seen as the lower rail (lower in a vertical direction) so that if the load is positioned above the first rail, the gravity forces the weight of the load towards the first rail via the load bearing element, e.g. where the load bearing element is positioned between the first rail and the load. Alternatively, if the load may be positioned below the first rail, the gravity forces the weight of the load towards the first rail, where the first rail is positioned between the load and the load bearing element.

The present disclosure may be adapted to provide a footwear manufacturing conveyor system where the second guide rail ensures that there is a less risk that the vehicle tilts during movement of the vehicle along the conveyor system. If the vehicle tilts beyond a certain angle, a part of the vehicle which is not intended to be in contact with the rails may touch the rails, and cause the vehicle to brake due to friction, which in turn creates instability of the payload. The provision of the second rail on the opposite side of the load bearing element ensures that if the load bearing element lifts up from the first rail, the load bearing element will come into contact with the second load bearing element, and prevent the movement of the load bearing element beyond a predefined distance in the area between the first rail and the second rail.

Other solutions to such problems have e.g. been shown as providing a second load bearing element, positioned on an opposite side of the rail, so that the vehicle has two opposing load bearing elements that attach the vehicle to the rail, such as opposing wheels. This, however, may be problematic, as this provides the vehicle with another moveable part, where a second moveable part increases the risk that the vehicle may break down, e.g. in the case of worn bearings, etc.

The present disclosure may be seen as a solution where a mechanical immovable part may be added to the footwear manufacturing conveyor system in the form of a second rail, where the second rail may be positioned so that an opposing part of the load bearing part may come into contact with the rail if a part of the load bearing part departs from the first rail, and thereby prevents the vehicle from tilting.

Within the understanding of the present invention, the term "conveyor system" (of a footwear manufacturing conveyor system) may be understood as a transport system, where the transport system provides a guideway having a plurality of regions in which one or more vehicles are propelled for manufacturing footwear.

Within the understanding of the present disclosure, the term "vehicle" may mean a load bearing element where the load bearing element may be adapted to travel along a guided pathway along a transport system or a conveyor system. The vehicle may be adapted to carry a payload, which is supposed to move from one position to another along the conveyor/transport system.

Within the context of the present invention the propulsion system of the footwear manufacturing conveyor system may be propelled by rotary or linear motors, or specifically in the form of a magnetic transportation system where the conveyor system may be provided with a plurality of electrical coils, where the electrical coils provide a magnetic propulsion to a magnet which is positioned on the vehicle. For example, the propulsion system may have a plurality of electrical coils configured to provide magnetic propulsion. Thus, by controlling the electrical signals that are sent towards the coils, the coils can propel the vehicle by applying a magnetic force (field) in the vicinity of the vehicle, and where the electrical signal is transferred from one coil to another to push or pull the vehicle using the magnetic force. Such a system may e.g. be seen in WO 2015/042409.

WO2015/042409 discloses a transport system comprising a guideway having a plurality of regions in which one or more vehicles are propelled, where each such vehicle includes a magnet disposed along each region are a plurality of propulsion coils, each comprising one or more turns that are disposed about a common axis, such that the respective common axes of the plurality of coils in that region are (i) substantially aligned with one another, and (ii) orthogonal to a direction in which the vehicles are to be propelled in that region.

Within the context of the present disclosure, the term "load bearing element" may be understood as the part of the vehicle, where the load is transferred from the vehicle to the rail. Such a load bearing element may e.g. be in the form of a rolling element, such as a wheel, where the wheel is connected to the vehicle, and is adapted to run on the rail in the same direction as the vehicle during the vehicle propulsion. An alternative load bearing element could be a roller, a magnetic element which may levitate a distance away from the first rail (maglev), an air cushion element, or any type of element which can interact with the first rail to reduce friction along the footwear manufacturing conveyor system, and ensure that the vehicle is in its correct position relative to the footwear manufacturing conveyor system.

In the event where the load bearing element is a rolling element such as a wheel, the first rail may be positioned on one side of the wheel and the second rail may be positioned on an opposite side of the wheel, in a direction that is radial to the rotational axis of the wheel, ensuring that that the wheel, during rolling motion, may be in contact with the first rail or the second rail.

Guideways may for example be understood as a channel or channels for facilitating motion, for example motion of a vehicle according to the invention. A guideway may also decide the directionality of the motion, e.g. passively by physical constrains, to define a trajectory of the guideway in which a vehicle may move.

In one exemplary embodiment the load bearing element comprises a first rail engaging part and a second rail engaging part. The first rail engaging part and the second rail engaging parts may be configured to be in direct or indirect contact with the first and/or the second rail in at least two separate regions of the rail. Thus, the first rail engaging part may bear a first part of the load transmitted from the vehicle to the first rail, while the second rain engaging part may bear a second part of the load transmitted from the vehicle to the first rail. Thus, the rail engaging parts may be utilized to distribute the load transmitted from the vehicle to the rail into at least two different positions of the first rail. In one embodiment the first rail engaging part may be in contact with the first rail at the same time the second rail engaging part is in contact with the first rail. In one embodiment the load bearing element may be configured such that the first rail engaging part may be in contact with the first rail, while the second rail engaging part may be in contact with the second rail. In one embodiment the load bearing element may comprise a third rail engaging part, a fourth rail engaging part, or further rail engaging parts. The provision of a first and a second rail engaging parts may increase the stability of the vehicle, as the load may be distributed in different positions along the first rail.

The presence of the second rail may limit how much the vehicle may tilt relative to the first rail by arranging the first and/or the second load bearing element to comes into contact with the second rail, and thereby mechanically prevent the vehicle to tilt beyond a certain angle.

In one embodiment the second rail may be adapted to allow the vehicle to tilt up to a predefined angle, where the second rail may be configured to prevent the vehicle to tilt relative to the first rail beyond a predefined angle. Thus, the second rail may maintain the position of the vehicle and a payload within a certain angle, ensuring that the tilting of the vehicle does not affect the transport of the vehicle from one position to another along the footwear manufacturing conveyor system.

In one exemplary embodiment the first rail engaging part and the second rail engaging part are positioned along a travel axis along a direction of travel along the rail system. The travel axis may e.g. be parallel to the direction of travel along the rail system. Thus, the first rail engaging part is position at a first position along the travel axis and the second rail engaging part is positioned at a second position along the travel axis. Thus, when the vehicle travels along the rail system, the first rail engaging part may be the leading rail engagement part, while the second rail engaging part may be the trailing rail engagement part. This may mean that the first rail engaging part may be position in front of the second rail engaging part along the direction of travel. The positioning of the first and the second rail engaging parts along the travel axis may increase the stability of the vehicle, and therefore a potential payload of the vehicle. The positioning of the first and the second rail engaging parts along the travel axis may increase the length/width of the load bearing element, where the width of the load bearing element may increase the stability and increase the acceleration needed to move the centre of gravity beyond the position of the load bearing element. I.e. an increased distance between the first rail engaging element and the second rail engaging element may increase the acceleration needed to cause the vehicle to tip and/or lose balance.

In one exemplary embodiment a primary part of the vehicle is positioned on a first side of the first rail and a secondary part of the vehicle is positioned on an opposite second side of the first rail. By positioning the vehicle on both sides of the first rail, it is possible to position e.g. the propulsion system on the second side of first rail, while having e.g. the load bearing element on the opposite side of the rail. Thus, the secondary part of the vehicle may comprise a propulsion element, where the propulsion element is positioned so that it faces the second side of the first rail. The primary part of the vehicle may comprise the load bearing element which is in contact with the first side of the rail. Or the primary part may partially comprise the load bearing element, e.g. the first rail engaging part and/or the second rail engaging part. The primary part may further comprise the receiving part, which may also be referred to as a payload device. The first side of the first rail may also be understood as the upper side of the first rail, and the opposite side of the first rail may also be understood as a lower side of the first rail.

In one exemplary embodiment the vehicle comprises a receiving part adapted to receive a payload, such as a footwear last. The receiving part of the vehicle may be seen as a receiving section, a receiving element or a part of the vehicle that is configured to receive and possibly hold a payload. The receiving element may be positioned on a first side of the rail, e.g. on the same side as the load bearing element when the payload is above the load bearing element.

Alternatively, the receiving part may be positioned on a side of the first rail that is opposite the side which is in contact with the load bearing element, e.g. when the payload is adapted to be below the first rail and/or the vehicle. The receiving part may be arranged on a primary part of the vehicle, i.e. on a part which is easily accessible by workers, robotic arms or other elements that may be used to attach and/or remove payloads from the vehicle.

In one exemplary embodiment the first rail engaging part may be positioned on one side of a receiving part and a second rail engaging part may be positioned on an opposite side of the receiving part. This means that the receiving part may be positioned in a region that is that extends from the first rail engaging part to the second rail engaging part. The position may improve the balance of the vehicle when a payload is present on the vehicle, as the centre of gravity of the payload may be positioned between the first rail engaging part and the second rail engaging part in the direction of travel and/or in a direction transverse to the direction of travel. The positioning of the receiving part may improve the stability of the vehicle when a payload is present.

In one exemplary embodiment the vehicle in a loaded configuration comprises a payload so that the centre of gravity (mass) of the vehicle and payload is at a distance from a volume of the vehicle, and/or a unloaded configuration where the centre of gravity is within a volume of the vehicle. The volume of the vehicle may be seen as being defined as the volume which is defined by the boundaries of the vehicle. When the vehicle does not have a payload, the centre of mass of the vehicle on its own may be defined within the body of the vehicle, which means that vehicle is relatively stable and an acceleration force within a predefined limit in the direction of travel will not cause the vehicle to become unstable and will therefore not be inclined to tip over or tilt at an angle to the rail. However, within the present disclosure when a payload is applied to the vehicle, the payload may be of such a kind that the centre of mass of the vehicle and the payload may travel in a direction towards a boundary of the payload. As an example, when a payload is applied to an upper surface of the vehicle, and the payload has a predefined height, the centre of mass may be present within the volume of the payload and not the vehicle. This transformation of the centre of mass from inside the volume to an outside of the vehicle (outside the volume of the vehicle) may cause the vehicle to become unstable, so that an acceleration force applied to the vehicle (and thus the payload) may be too high for the loaded vehicle to be stable, and may cause the loaded vehicle to tilt, where the tilting may affect the friction between the vehicle and the rail.

Within the understanding of the present invention the term centre of gravity may be understood as the centre of mass. This may mean that the centre of mass may be the unique point where the weighted relative position of the distributed mass sums to zero.

In the context of the present invention, the footwear manufacturing conveyor system may also be referred to as a conveyor system. The conveyor system may be adapted to transport parts that are needed for footwear manufacturing from one position to another position in a footwear manufacturing process. As an example, the conveyor system may be utilized to transport a footwear upper from a first position to a second position in a footwear manufacturing system, where the first position may e.g. be a storage position for uppers prior to a sole assembly has been applied to the upper, while the second position may e.g. be a manufacturing station where a sole is applied to the upper. Alternatively, the first and/or the second position may be a manufacturing station where an upper is transported to after a sole is applied to the upper.

In one exemplary embodiment the conveyor system may be part of a DIP footwear manufacturing assembly, where the conveyor system may move an upper from a first position to a second position, where the manufacturing assembly is adapted to apply the sole assembly to the upper using an injection moulding process.

In one exemplary embodiment the payload is a footwear last. The last may be utilized to transport an upper from one position to another position in a shoe manufacturing assembly, where the upper may be lasted onto the last carried by the vehicle. The presence of a footwear last as a payload to the vehicle may cause the centre of gravity (mass) to be positioned well away from the volume of the vehicle, so that acceleration forces applied to the loaded vehicle may cause the vehicle to tilt. When the vehicle tilts, one or more load bearing elements may move away from the first rail, which may mean that the vehicle is not in its correct position, and one or more parts of the vehicle, which are not intended to transmit force from the vehicle to the rail may come into contact with the first rail and thereby increase the friction between the first rail and the vehicle. However, the presence of the second rail may limit the tilt of the vehicle, so that a part of the load bearing element comes into contact with the second rail, and thereby mechanically prevents the vehicle to tilt beyond a certain limit.

In one exemplary embodiment the payload is a footwear last where the sole surface of the last faces away from the vehicle. The footwear last may be attached to the vehicle in such a manner so that the neck portion of the last is attached facing the vehicle, while the sole part of the last faces away from the vehicle.

In one exemplary embodiment the load bearing element comprises at least one rolling element. The rolling element may e.g. be a wheel, where the wheel is connected to the vehicle, and is adapted to run on the rail in the same direction as the vehicle during the vehicle propulsion. An alternative load bearing element could be a roller, a magnetic element which may levitate a distance away from the first rail (maglev), an air cushion element, or any type of element which can interact with the first rail to reduce friction along the footwear manufacturing conveyor system, and ensure that the vehicle is in its correct position relative to the conveyor system and/or the first rail and/or the second rail.

In the event where the load bearing element is a rolling element such as a wheel, the first rail may be positioned on one side of the wheel and the second rail may be positioned on an opposite side of the wheel, in a direction that is radial to the rotational axis of the wheel, ensuring that the wheel, during rolling motion, may be in contact with the first rail or the second rail.

Alternatively, the rolling element may be any kind of rolling element such as one or more ball bearings which may be positioned between two bearing rings. Alternatively, the rolling element may be a wheel having an elastomeric outer surface, such as a rubber ring. In one embodiment the rolling element may be a wheel that is connected to an axle via a ball bearing. In one embodiment the rolling element may be any kind of rolling element that may have a low rolling resistance and low sliding between the vehicle and the rail system (first and/or second rail).

In one exemplary embodiment the first rail engaging part comprises at least one rolling element and the second rail engaging part comprises at least one rolling element. Thus, the load bearing element may comprise at least two rolling elements, where the two rolling elements may be positioned at a distance from each other and/or may be positioned along a travel axis of the rails. Thus, the first rolling element may bear part of the load of the vehicle and/or the payload, while the second rolling element may bear a second part of the load of the vehicle and/or the payload.

In one exemplary embodiment the load bearing element cooperates with the first rail or the second rail at one longitudinal position of the vehicle. Thus, this means that the load bearing element is positioned in such a way that one load bearing element can only be in contact with the first rail or the second rail at any one point in time. Thus, if the load bearing element is in contact with the first rail, that part of the load bearing element is not in contact with the second rail, and vice versa. I.e. when the load bearing element is in the form of e.g. a wheel, the wheel only touches one of the rails at any point in time, and not both at the same time. In one example, the rolling elements may be positioned in a region between the first rail and the second rail, where the rolling elements are in contact with the first rail when the vehicle is stationary.

In one exemplary embodiment the distance between the first rail and the second rail is larger than the height of the load bearing element. The distance may be seen as a vertical gap between a surface of the first rail that faces a surface of the second rail.

In one exemplary embodiment, the distance is smaller than 5 heights of the load bearing element, for example smaller than 3 heights of the load bearing element, for example smaller than 2 heights of the load bearing element, for example smaller than 1.5 heights of the load bearing element.

In one exemplary embodiment the vehicle has an I shaped (beam shaped, having a vertical portion and two opposing horizontal portions) in a cross sectional view.

In one exemplary embodiment, said receiving part is detachably connected to said footwear last.

In one exemplary embodiment, said footwear manufacturing conveyor system comprises a plurality of vehicles, wherein said plurality of vehicles comprises said vehicle.

In one exemplary embodiment, said plurality of vehicles are accelerated independently of each other.

In other words, an individual vehicle may be controlled independently from the motion of other vehicles. For example, one vehicle may stand still, while another vehicle is moving or accelerating. Thus, efficiency of the footwear manufacturing conveyor system may be improved.

In one exemplary embodiment, said load bearing element comprises a third rail engaging part engaging horizontally with a rail of said first rail, said second rail, and a third vertical rail.

In one exemplary embodiment, said third rail engaging part is located on a lower side of said first rail.

A horizontal engagement may improve horizontal stability, which is advantageous.

In one exemplary embodiment, said footwear manufacturing conveyor system is a part of a direct injection processing assembly adapted to apply a sole assembly to an upper using an injection moulding process, wherein said upper is lasted to said footwear last.

The second rail may permit increased stability during an injection moulding process, which is advantageous.

An aspect of the invention relates to a method for reducing friction of a vehicle in a footwear manufacturing conveyor system, said method comprising the steps of: engaging a load bearing element of said vehicle with a rail system comprising a first rail and guideways positioned within the boundary of the first rail, adapted to provide at least one path of travel along the rail system, wherein the rail system further comprises a second rail, positioned at an opposite side of the load bearing element; receiving a footwear last by a receiving part of said vehicle; and propelling said vehicle using a propulsion system provided with a plurality of electrical coils, wherein the electrical coils provide a magnetic propulsion to a propulsion element of said vehicle.

In one exemplary embodiment, a primary part of the vehicle is positioned on a first side of the first rail and a secondary part of the vehicle is positioned on an opposite side of the first rail.

In one exemplary embodiment, said load bearing element has a primary surface which is configured to engage with the first rail and an opposite secondary surface.

In one exemplary embodiment, said load bearing element comprises a first rail engaging part and a second rail engaging part.

In one exemplary embodiment, said vehicle is accelerated when the vehicle is propelled, causing a rail engaging part of said first rail engaging part and said rail engaging part to lift from the first rail.

In one exemplary embodiment, said vehicle is accelerated when the vehicle is propelled, causing a rail engaging part of said first rail engaging part and said rail engaging part to come into contact with the second rail.

Accelerating a vehicle such that a rail engaging part lifts, or even comes into contact with the second rail, is a way of quantifying a relatively large acceleration of a vehicle and a last with a center of gravity above the vehicle. Such a relatively large acceleration may not be permitted by systems without a second rail without causing friction.

In one exemplary embodiment, said method further comprises a step of lasting an upper onto said footwear last, for example at a lasting station.

The second rail may permit increased stability during lasting, which is advantageous.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

THE DRAWINGS

Figure 3A:
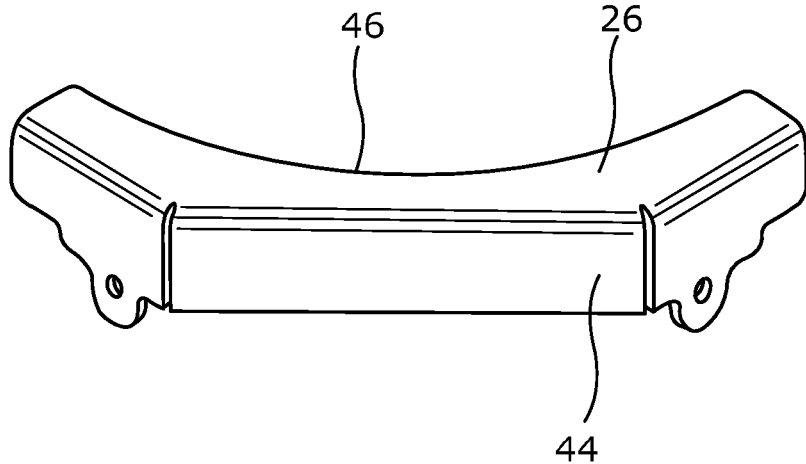
Figure 3B:
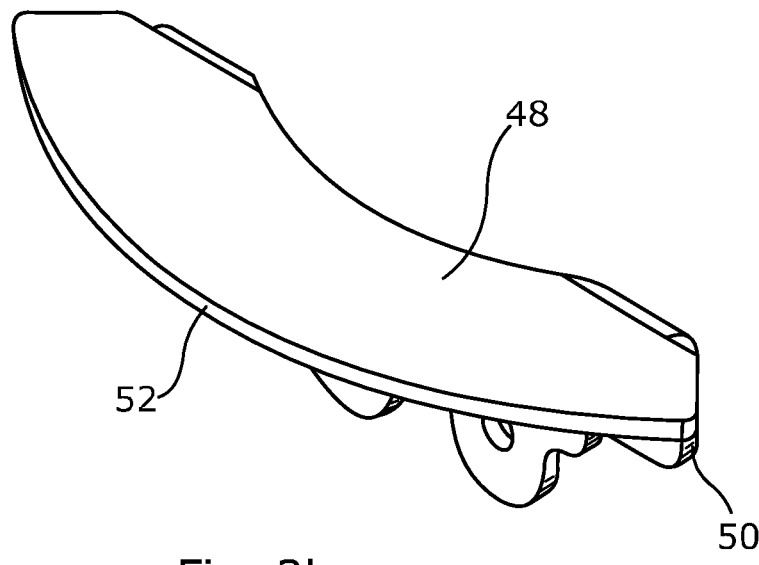
Figure 4:
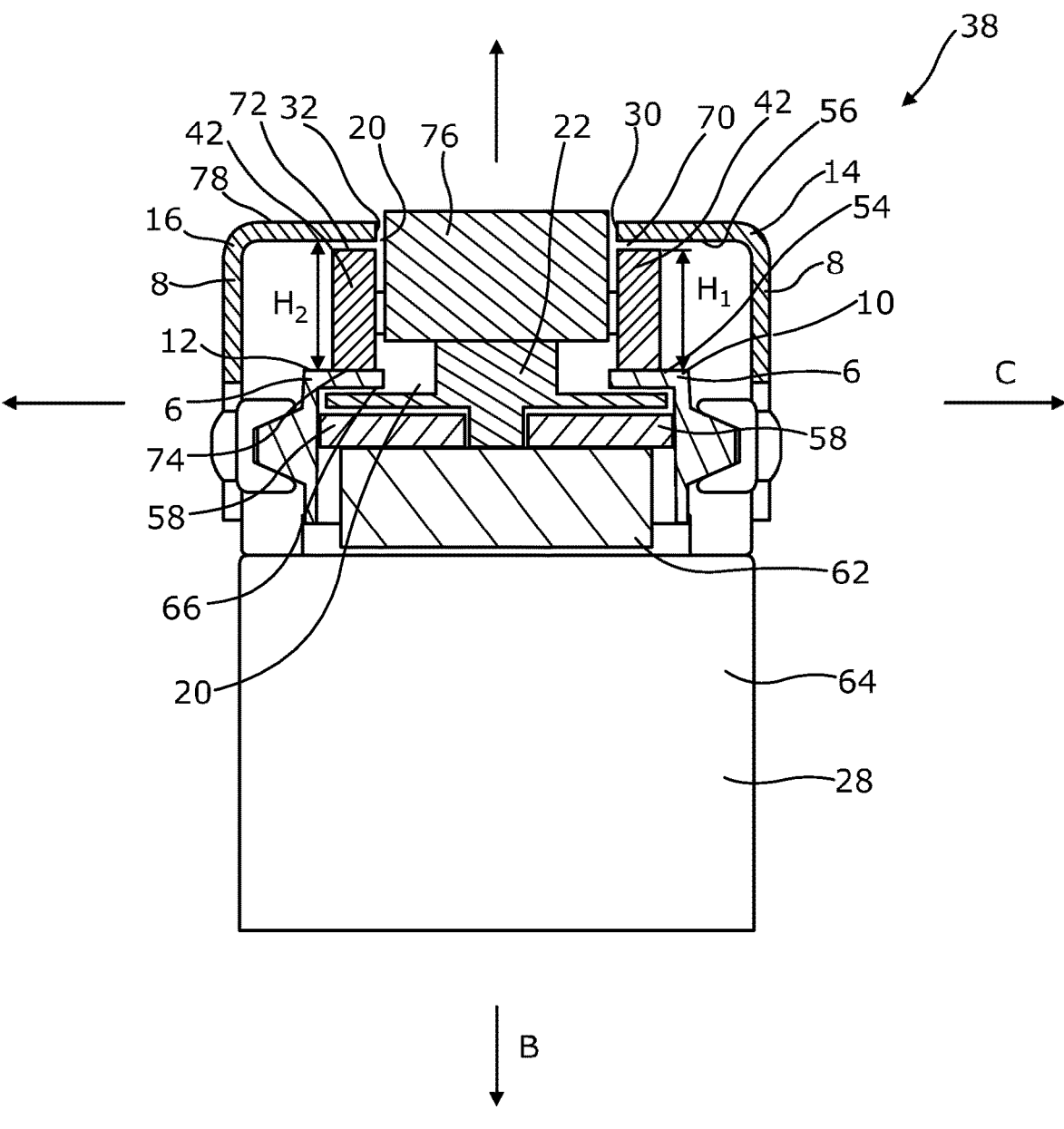

The following is an explanation of exemplary embodiments with reference to the drawings, in which FIG. 1 shows a perspective view of a rail system, FIG. 2 shows a top view of a rail system, FIGS. 3a and 3b show the inner and outer second rails of a curve in a rail system, FIG. 4 shows a cross sectional view seen in a longitudinal direction of a part of a footwear manufacturing conveyor system in accordance with the present disclosure, and FIG. 5a-FIG. 5d show a partly cross sectional view seen from the side of a part of a footwear manufacturing conveyor system in accordance with the present disclosure.

DETAILED DESCRIPTION

FIG. 1 shows a perspective view of a rail system 2 and a propulsion system 4 in accordance with the present disclosure. The propulsion system 4 may be in the form of a plurality of propulsion coils (not shown). Parts of the footwear manufacturing system, particularly the propulsion system, may for example be constructed using propulsion system principles from WO 2015/042409, although the invention is not limited to such propulsion systems. The system may thus comprise a plurality of coils, that are positioned below a rail system 2, and where the coils are adapted to propel a vehicle 22, as e.g. shown in FIG. 4. Such a system may permit individual control and acceleration of vehicles.

The rail system 2 may comprise a first rail 6 which in this example is a lower rail, and a second rail 8 which in this example is an upper rail, where the first rail 6 may comprise a first primary side rail 10 and a first secondary side rail 12, and the second rail may comprise a second primary side rail 14 and a second secondary side rail 16. The primary and secondary side rails may be seen as opposing rail pairs, having a first gap 18 and a second gap 20 between them, respectively, where a magnetic vehicle (22) may be positioned between the gaps 18, 20 to be propelled along the rail system 2, as seen e.g. in FIG. 2. The second primary side rail 14 and the second secondary side rail 16 may be attached to a base 28 providing support for the second primary side rail 14 and the second secondary side rail 16, where the base 28 may also provide support to the first primary side rail 10 and a first secondary side rail 12, as well as the propulsion system. The second primary side rail 14 and the second secondary side rail 16, may have an L shape (as seen in FIG. 4) where a first end 30 of the second primary side rail 14 and a first end 32 of the second secondary side rail 16, are connected to the base 28, while the a second end 34 of the second primary side rail 14 and a second end 36 of the second secondary side rail 16 define the second gap 20.

The first rail 6 and the second rail 8 may be separated in a vertical direction B by a space 40, where the space 40 is adapted to receive a wheel 42 which may suspend the vehicle 22 on the rail system.

The rail system may also comprise at least one bend 24, where the bend may alter the direction of the vehicle 22 from one direction to another direction. For this system, where the rail system has a first rail 6 and a second rail 8, the outer bend portion 26 of the second rail 8 may be seen in FIG. 3a, where the first end 44 of the bend portion is adapted to be attached to the base, while the second end 46 defines an outer portion of the second gap 20 of the rail system in the bend. Similarly, the inner bend portion 46 has a first end 50 and a second end 52, where the first end is adapted to be attached to the base 22, and the second end is adapted to define the inner part of the second gap 20 of the rail system. The inner bend portion 48 and the outer bend portion 26 may be adapted to connect two gaps, where the longitudinal axis of the gaps extend in different directions on either side of the bending portions. The first rail 8 will have similar bending portions on the inner and the outer part of the first gap 18, that substantially match the gap of the second rail in the bend 24.

The gaps 18, 20 in the first rail 6 and the second rail 8 may be have a central axis A, where the central axis A may extend substantially in parallel the first rail and the second rail, and may define the direction of travel of the vehicle 22 along the rail system. The propulsion system may be operated by energizing one or more of the electrical coils of the propulsion systems, allowing the magnetic part of the vehicle to be propelled along the central axis A along the rail system. The magnetic coils may be positioned along the central axis A, where the coils are sequentially energized to use magnetic force to push and/or pull the vehicle 22.

FIG. 4 shows a sectional view of a transport system 38 taken along axis IV-IV seen in FIG. 1, where a vehicle 22 is located inside the gaps 18, 20 of the first rail 6 and the second rail 8, respectively. The second primary side rail 14 and the second secondary side rail 16 are attached to the base 28, where the rails 6, 8 define a first contact surface 54 and a second contact surface 56, for a wheel 42 which suspends the vehicle and allows for a low friction travel along the longitudinal axis A of the rails (seen in Fig. A). The vehicle 22 has a first set of wheels 42 which suspend the vehicle in a vertical direction B, and a second set of wheels 58 that come in contact with an inner surface 60 of the first primary side rail 10 and the first secondary side rail 12, suspending the vehicle in a transverse direction C, and ensuring that the vehicle is substantially immovable in the transverse direction C during operation. The second wheels 58 may be positioned on a first side 66 of the first rail 6 while the second wheels may be positioned on an opposing side (first contact surface) 54 of the first rail 6, and where the vehicle 22 extends through the first gap 18 in a vertical direction. The second wheels 58 may be suspended by a brace 80, where the brace may be positioned between the wheels 58 and the first side 66 of the first rail 6, positioned in close proximity to the first side 66 of the first rail 6, without coming into contact touching the first rail 6, when the vehicle 22 is in a still position.

The vehicle 22 further comprises a first propulsion device 62, such as a magnet, where the first propulsion device 62 is adapted to interact with a second propulsion device 64 which is located in the base 28 or the propulsion system 4 of the rail system 2. The second propulsion device 64 may be electric coils that may be controlled to propel the vehicle 22 in the direction of travel A, shown in FIG. 1. The first propulsion device 62 may be positioned on a first side 66 of the first rail 6.

The wheel 42 may be positioned in a space 40 which is defined between the first contact surface 54 and the second contact surface 56, where the wheel has an outer surface 68 that is adapted to come into contact with the first contact surface 54 or the second contact surface 56. The wheel may have a height H1 that is less than the distance (second height) H2 from the first contact surface 54 to the second contact surface 56 in the vertical direction A. Thus, the wheel 42 can only be in contact with either the first contact surface 54 or the second contact surface 56, as the difference in height between H1 and H2 creates a third gap 70 between the wheel and the second contact surface 56, or alternatively between the wheel and the first contact surface 54, should the wheel 42 contact the second contact surface 56. If the height H1 would be equal to H2, then the wheel 42 would be in contact with both the first contact surface 54 and the second contact surface 56, which would mean that it would not be able to rotate, as the upper surface 72 of the wheel 42 would travel in one direction, while a lower surface 74 of the wheel 42 would travel in an opposite direction.

The vehicle 22 may further comprise a payload device 76, where the payload device may be adapted to receive a payload (shown in FIG. 5a-5d), or an intermediate bracket allowing the attachment of a payload. The payload device 76 may extend in a vertical direction A out of the gap 20 and may have a height that is higher than the upper (second) surface 78 of the second rail 8.

Figure 5A:
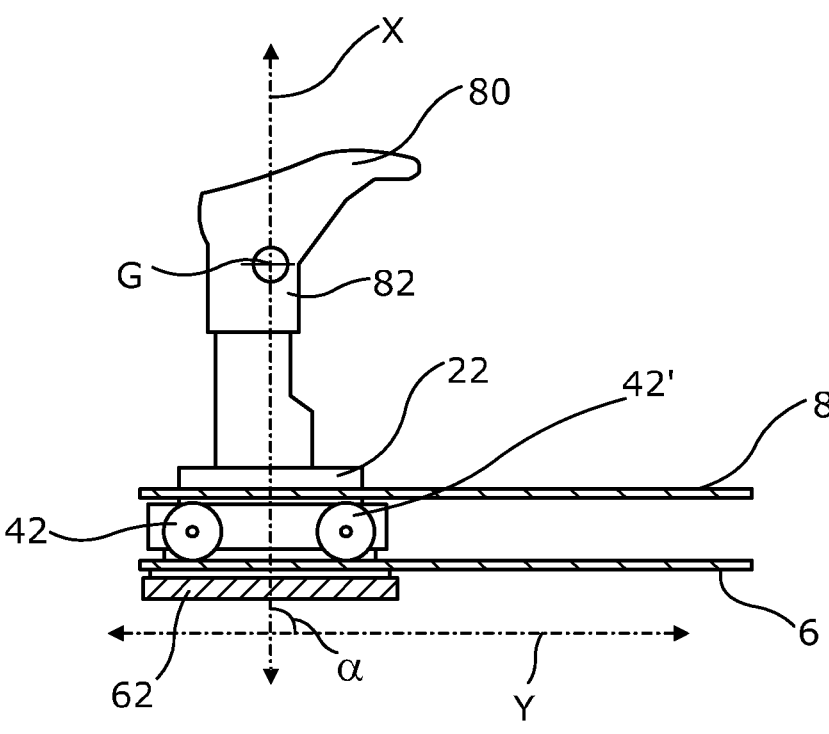

FIG. 5a-5d shows the vehicle 22 being suspended by the first rail 6 via the wheels 42, while the vehicle is in a still position as seen in FIG. 5a. The payload device 76 of the vehicle 22 is in this example loaded with a last 80 for a shoe as a payload 82. Due to the weight of the payload 82 the center of gravity G (center of mass) of the combined vehicle 22 and payload 82 is positioned at a distance from the first 6 and the second rail 8 and the vehicle 22. The combined payload 82 and the vehicle has a central axis X, which is substantially at an angle to a horizontal axis Y, which may be parallel to the central axis A of the rail system 2.

Figure 5B:
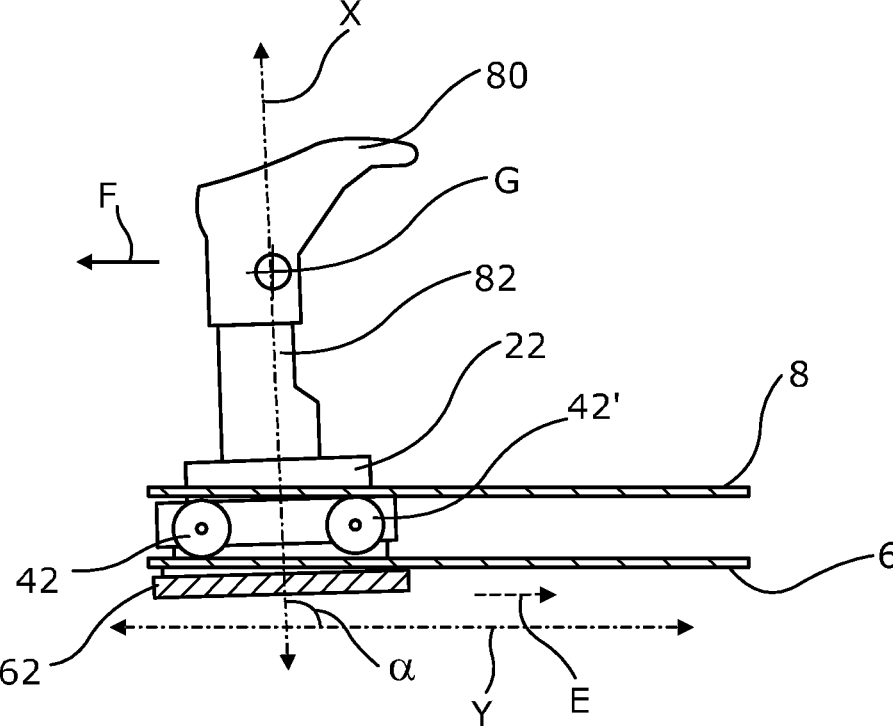

The vehicle has a first propulsion device 62, which is positioned at a distance from the center of gravity G. When the vehicle 22 is propelled in the direction of travel A, the vehicle is accelerated in the direction shown with arrow E, as shown in FIG. 5b. Due to the distance from the vehicle 22 or the propulsion device 62 to the centre of gravity G the acceleration E, the vehicle 22 will accelerate faster than the centre of gravity G and the payload may tilt at an angle $\alpha$ which may be greater than 90 degrees (right angle), shown by the arrow F. This will cause the front wheel 42' of the vehicle to lift from the first rail 6. If the second rail would not be present, the propulsion device 62, or the part of the vehicle that is below the first rail, would come into contact with the first side 66 of the first rail 6, and friction would occur. However, in this example, the second rail is positioned above the front wheel 42' so that when the front wheel has left the first contact surface 54 of the first rail, it will come into contact with the second surface 56 of the second rail, and thereby preventing the vehicle 22 and the payload 82 to tilt beyond a predetermined degree, and thereby maintaining the upright position of the payload 82 and also preventing the part which is below the first rail to come into contact with the first surface.

Figures 5C, 5D:
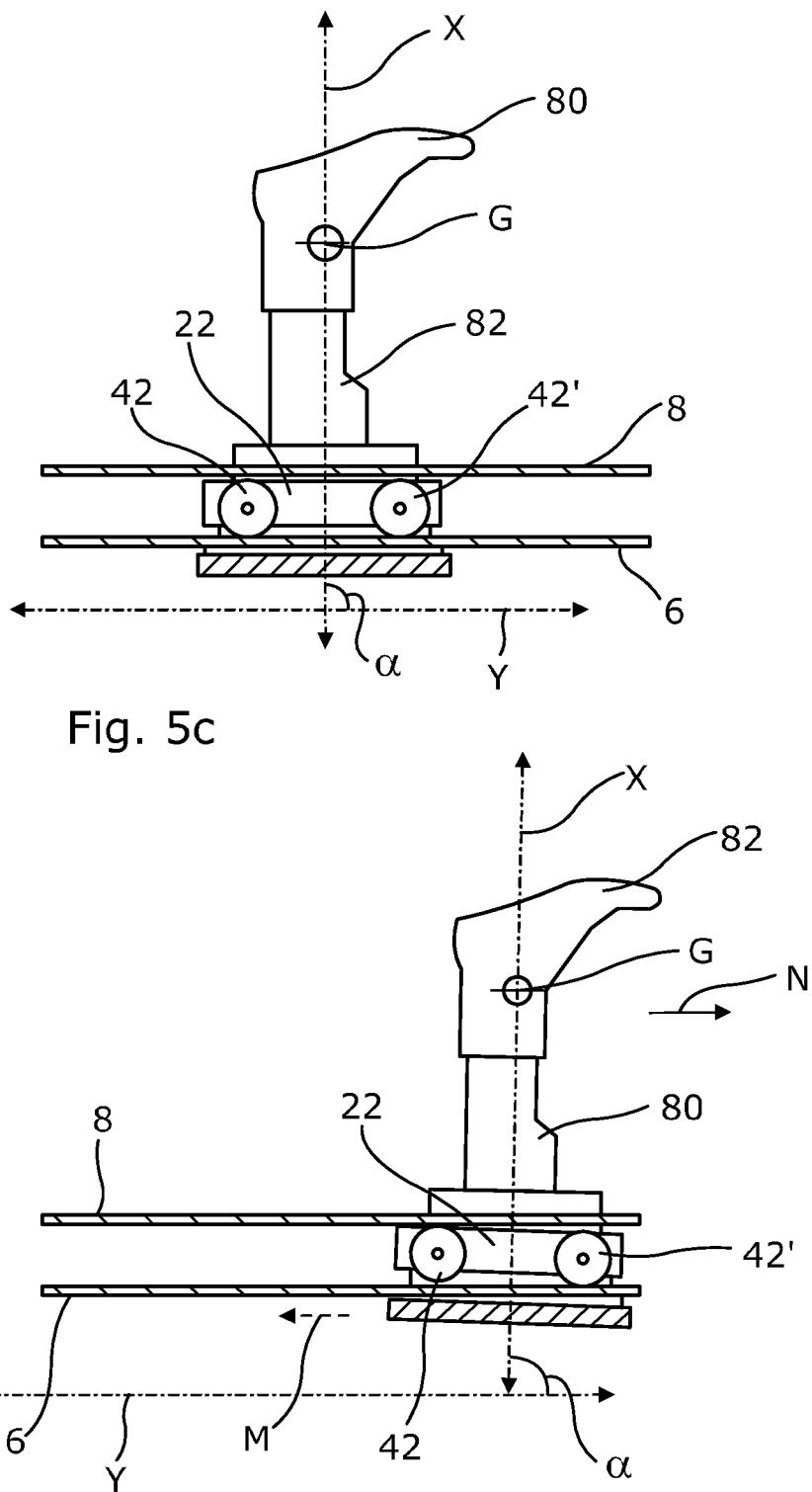

When the vehicle 22 has accelerated to its travel speed, as seen in FIG. 5c, the vehicle and the payload will tilt back to an upright position, where the angle $\alpha$ is substantially 90 degrees. and if a steady velocity is maintained, the centre of gravity G and the vehicle 22 will not tilt relative to the rails.

However, at a certain point in time, the payload 82 has been transported to its delivery position along the rails 6, 8, and the vehicle has to be decelerated, having a acceleration in the opposite direction M. This causes the payload 82 to accelerate at a slower rate than the vehicle 22 seen by arrow N, which may cause the back wheel 42 to lift from the first rail 6 and come into contact with the second rail 8, and thereby preventing unnecessary contact of the vehicle 22 with the first 6 and/or the second rail 8, in a similar manner as shown in FIG. 5b. Thus, the angle $\alpha$ will be less than 90 degrees.

Thus, the second rail may ensure that the vehicle will not tilt too much during accelerations and decelerations along the central axis A of the rail system.

In a similar manner, the invention may also permit larger (centripetal) accelerations during circular motion, e.g. in a curve of a rail system. For example, the invention may permit a larger speed of the vehicle in the curve, which is advantageous. Or the invention may permit a smaller radius of the curve, which in turn allows larger flexibility of designing a conveyer system and a more compact design, which is advantageous.

The use of the terms "first", "second", "third" and "fourth", "primary", "secondary", "tertiary" etc. does not imply any particular order but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

REFERENCE NUMBERS

2 Rail system
4 Propulsion system
6 First rail
8 Second rail
10 First primary side rail
12 First secondary side rail
14 Second primary side rail
16 Second secondary side rail
18 First gap
20 Second gap
22 Vehicle
24 Bend
26 Outer bend portion
28 Base
30 First end of the second primary side rail
32 First end of the second secondary side rail
34 Second end of the first primary side rail
36 second end of the first primary side rail
38 Transport system
40 Space between first rail and second rail
42 Wheel
44 First end of outer bend portion
46 Second end of outer bend portion
48 Inner bend portion
50 First end of inner bend portion
52 Second end of inner bend portion
54 First contact surface
56 second contact surface
58 Second wheel
60 Inner surface of first side rail
62 First propulsion device 64 Second propulsion device
66 First side of first rail
68 Outer surface of wheel
70 Third Gap
72 Upper surface of first wheel
74 Lower surface of first wheel
76 Payload device
78 Upper surface of second rail
80 Last
82 Payload
H1 Height of First wheel
H2 Height of space
A Central axis—direction of travel
B Vertical axis
C Transverse axis
G Centre of gravity (Centre of mass)
X Central axis of payload
Y Horizontal axis
E Acceleration
F Tilting motion
M Deceleration
N Tilting motion

The invention claimed is:

1. A footwear manufacturing conveyor system comprising:
   a rail system comprising:
      a first rail, and
      guideways positioned within a boundary of the first rail, adapted to provide at least one path of travel along the rail system;
   a propulsion system with a plurality of electrical coils configured to provide magnetic propulsion; and
   a plurality of individual independently-controlled vehicles including:
      a magnet configured to interact with the propulsion system,
      a receiving part adapted to receive a footwear last, and
      a load bearing element having a primary surface which is configured to engage with the first rail and an opposite secondary surface,
   wherein the rail system further comprises a second rail, positioned at an opposite side of the load bearing element, and
   wherein the plurality of individual independently-controlled vehicles are configured to accelerate independently, respectively, along the rail system.

2. The conveyor system in accordance with claim 1, wherein the load bearing element comprises a first rail engaging part and a second rail engaging part.

3. The conveyor system in accordance with claim 2, wherein the first rail engaging part and the second rail engaging part are positioned along an axis along a direction of travel along the rail system.

4. The conveyor system in accordance with claim 1, wherein, when a respective vehicle of the plurality of individual independently-controlled vehicles is in a loaded configuration, a payload is such so that a center of gravity of the respective vehicle and the payload is at a distance from a volume of the respective vehicle, and/or
   wherein, when the respective vehicle is in an unloaded configuration, the center of gravity is within the volume of the respective vehicle.

5. The conveyor system in accordance with claim 4, wherein the payload is a footwear last where a sole surface of the footwear last faces away from the respective vehicle.

6. The conveyor system in accordance with claim 1, wherein the load bearing element comprises at least one rolling element.

7. The conveyor system in accordance with claim 1, wherein the load bearing element cooperates with the first rail or the second rail at one longitudinal position of the at least one vehicle.

8. The conveyor system in accordance with claim 1, wherein a distance between the first rail and the second rail is larger than a height of the load bearing element.

9. The conveyor system in accordance with claim 1, wherein said receiving part is detachably connected to said footwear last.

10. The conveyor system in accordance with claim 1, wherein said load bearing element comprises a third rail engaging part engaging horizontally with at least one of said first rail, said second rail, or a third vertical rail.

11. The conveyor system in accordance with claim 10, wherein said third rail engaging part is located on a lower side of said first rail.

12. The conveyor system in accordance with claim 1, wherein said footwear manufacturing conveyor system is a part of a direct injection processing assembly adapted to apply a sole assembly to an upper using an injection molding process, and wherein said upper is lasted to said footwear last.

13. A method for reducing friction of a plurality of individual independently-controlled vehicles in a footwear manufacturing conveyor system, said method comprising steps of, for the plurality of individual independently-controlled vehicles, respectively:

engaging a load bearing element of the plurality of individual independently-controlled vehicles with a rail system including:

a first rail, guideways positioned within a boundary of the first rail, the guideways being adapted to provide at least one path of travel along the rail system, and a second rail positioned at an opposite side of the load bearing element;

receiving a footwear last by a receiving part of the plurality of individual independently-controlled vehicles; and propelling the plurality of individual independently-controlled vehicles using a propulsion system provided with a plurality of electrical coils that provide a magnetic propulsion to a propulsion element of the plurality of individual independently-controlled vehicles, wherein the plurality of individual independently-controlled vehicles are configured to accelerate independently along the rail system.

14. The method in accordance with claim 13, wherein said load bearing element has a primary surface which is configured to engage with the first rail and an opposite secondary surface.

15. The method in accordance with claim 13, wherein the load bearing element includes a first rail engaging part and a second rail engaging part, and wherein the plurality of individual independently-controlled vehicles are accelerated when the plurality of individual independently-controlled vehicles are propelled, causing the first rail engaging part to lift from the first rail.

16. The method in accordance with claim 13, wherein the load bearing element includes a first rail engaging part and a second rail engaging part, and wherein the plurality of individual independently-controlled vehicles are accelerated when the plurality of individual independently-controlled vehicles are propelled, causing the first rail engaging part to come into contact with the second rail.

17. The method in accordance with claim 13, wherein said method further comprises a step of lasting an upper onto said footwear last at a lasting station.

* * * * *